United States Patent
Boujenfa et al.

(10) Patent No.: US 11,511,787 B2
(45) Date of Patent: Nov. 29, 2022

(54) STEERING COLUMN FOR A MOTOR VEHICLE

(71) Applicants: thyssenkrupp Presta AG, Eschen (LI); thyssenkrupp AG, Essen (DE)

(72) Inventors: Sabrina Boujenfa, Nendeln (LI); Markus Domig, Bartholomäberg (AT); Benedikt Heigenhauser, Bern (CH)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 0 days.

(21) Appl. No.: 17/311,762

(22) PCT Filed: Jan. 7, 2020

(86) PCT No.: PCT/EP2020/050197
§ 371 (c)(1),
(2) Date: Jun. 8, 2021

(87) PCT Pub. No.: WO2020/144172
PCT Pub. Date: Jul. 16, 2020

(65) Prior Publication Data
US 2022/0024512 A1 Jan. 27, 2022

(30) Foreign Application Priority Data
Jan. 8, 2019 (DE) .................... 10 2019 200 150.5

(51) Int. Cl.
*B62D 1/184* (2006.01)
*B62D 1/19* (2006.01)

(52) U.S. Cl.
CPC ............ *B62D 1/184* (2013.01); *B62D 1/192* (2013.01)

(58) Field of Classification Search
CPC ......... B62D 1/184; B62D 1/192; B62D 1/195
See application file for complete search history.

(56) References Cited

U.S. PATENT DOCUMENTS

| 8,438,944 B2 * | 5/2013 | Ridgway | ............... | B62D 1/184 74/495 |
| 8,500,168 B2 * | 8/2013 | Goulay | .................. | B62D 1/184 74/493 |

(Continued)

FOREIGN PATENT DOCUMENTS

| CN | 102099238 A | 6/2011 |
| CN | 106043408 A | 10/2016 |

(Continued)

OTHER PUBLICATIONS

English Translation of International Search Report issued in PCT/EP2020/050197 dated Mar. 4, 2020.

*Primary Examiner* — Drew J Brown
(74) *Attorney, Agent, or Firm* — thyssenkrupp North America, LLC

(57) ABSTRACT

A steering column may include a casing pipe disposed longitudinally movably in a casing unit, a steering spindle rotatably supported about a longitudinal axis in the casing pipe, and a clamping device configurable in a fixing position for securing the casing unit relative to the casing pipe. The clamping device may have an engagement element supported on the casing pipe, having an upper side parallel to the longitudinal axis, and having lateral edge sides. The clamping device may have a locking element supported in the longitudinal direction on the casing unit and that can be moved to adjust the fixing position in a normal direction of the upper side against the engagement element. Positive-locking elements on the locking and engagement elements are engageable to produce a positive-locking connection in the longitudinal direction, at least some of which are disposed on an edge side of the engagement element.

19 Claims, 3 Drawing Sheets

(56) References Cited

U.S. PATENT DOCUMENTS

| | | | |
|---|---|---|---|
| 9,545,943 B2* | 1/2017 | Sakuda | B62D 1/192 |
| 10,752,281 B1* | 8/2020 | Kim | B62D 1/184 |
| 10,967,900 B2* | 4/2021 | Pichonnat | F16F 7/123 |
| 11,014,595 B2* | 5/2021 | Davies | B62D 1/184 |
| 2004/0089091 A1* | 5/2004 | Bechtel | B62D 1/184 |
| | | | 280/775 |
| 2011/0210536 A1 | 9/2011 | Monteil et al. | |
| 2016/0075367 A1* | 3/2016 | Sakuda | B62D 1/192 |
| | | | 74/493 |
| 2017/0320513 A1 | 11/2017 | Dubay | |
| 2017/0349203 A1* | 12/2017 | Anspaugh | B62D 1/195 |
| 2018/0050719 A1 | 2/2018 | Agbor et al. | |
| 2018/0093697 A1 | 4/2018 | Forte et al. | |
| 2018/0105196 A1 | 4/2018 | Bodtker | |
| 2018/0111640 A1* | 4/2018 | Bodtker | B62D 1/181 |
| 2018/0327019 A1 | 11/2018 | Bodtker et al. | |
| 2020/0189648 A1 | 6/2020 | Domig | |

FOREIGN PATENT DOCUMENTS

| | | |
|---|---|---|
| CN | 107567408 A | 1/2018 |
| DE | 10 2008 007 094 A | 9/2009 |
| DE | 10 2016 220 531 A | 4/2018 |
| DE | 10 2016 220 533 A | 4/2018 |

* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2020/050197, filed Jan. 7, 2020, which claims priority to German Patent Application No. DE 10 2019 200 150.5, filed Jan. 8, 2019, the entire contents of both of which are incorporated herein by reference.

FIELD

The present disclosure generally relates to steering columns, including adjustable steering columns for motor vehicles.

BACKGROUND

In order to adapt the steering wheel position to the seating position of the driver of a motor vehicle, steering columns in different configurations are known in the prior art. The steering wheel which is fitted to the rear end of the steering spindle can in a generic steering column be positioned by displacing the steering column longitudinal axis in the vehicle interior in the longitudinal direction.

The longitudinal displaceability is produced by an internal casing pipe, in which the steering spindle is rotatably supported, being able to be retracted and extended in the longitudinal direction relative to an outer casing unit in the manner of a telescope and being able to be secured, that is to say, releasably fixed, by means of a releasable clamping device in different longitudinal positions. The clamping device, also known as a fixing or securing device, acts on the casing unit which is retained on the body, wherein in the open state of the clamping device—referred to as the release position or disengagement position—a displacement of the casing pipe in the casing unit in order to adjust the steering wheel position is possible. By activating the clamping device, a clamping stroke is produced for securing so that in the closed state—also referred to as the fixing position or securing position—the casing pipe is clamped in the casing unit and during normal travel operation the steering wheel position is fixed under the mechanical loads which may be anticipated.

As an effective measure for improving the passenger safety in the event of a vehicle collision, the so-called occurrence of a crash—in which the driver strikes the steering wheel at high speed, it is known to also configure the steering column in the fixing position of the clamping device so as to be collapsible in the longitudinal direction when a high force which exceeds a limit value which only occurs in the event of a crash is applied to the steering wheel. In order to ensure controlled braking of a body which strikes the steering wheel, an energy absorption device is coupled between the casing unit and the casing pipe which are fixed to each other by means of the clamping device during normal operation but which are pushed together relative to each other in the event of a crash. This converts the kinetic energy which is introduced into plastic deformation of an energy absorption element, for example, by tearing open a tear-off flap or bending or compressing an elongate deformation element, such as a bending wire or bending strip.

A generic steering column is described in DE 10 2016 220 531 A1. The clamping device described therein comprises an engagement element which is fitted to the casing pipe and which is constructed as a toothed plate which extends in the longitudinal direction. The toothed plate has an upper side with a normal direction which is perpendicular to the longitudinal direction. At the upper side, there are formed positive-locking elements which protrude in the normal direction in the form of a tooth arrangement having a plurality of teeth which extend transversely relative to the longitudinal direction. A locking element is supported in the longitudinal direction on the outer casing unit and constructed as a toothing block which has at the front side thereof facing the upper side of the engagement element a tooth arrangement which corresponds to the mentioned tooth arrangement of the engagement element. For fixing, the locking element is moved by the clamping stroke of the clamping device in the normal direction toward the upper side of the engagement element until the front side comes into contact with the upper side and the positive-locking elements on the locking and engagement element move into engagement with each other in order to form a positive-locking connection which is active in the longitudinal direction. For release, the locking element is raised by the clamping device in the opposite direction in the normal direction from the engagement element so that the positive-locking connection of the tooth arrangements is released and the casing pipe can be displaced in the longitudinal direction in order to displace the steering wheel position in the casing unit.

In the generic steering column, the engagement element is connected to the inner casing pipe by means of an energy absorption device, which during normal operation forms a rigid connection between the outer casing unit and the inner casing pipe. In the event of a crash, however, such a large force is introduced into the engagement element via the locking element that the casing unit and the casing pipe move counter to each other in the longitudinal direction and an energy absorption element which is introduced in the force path between the engagement element and the casing pipe becomes plastically deformed, whereby the movement is braked in a controlled manner.

A disadvantage is the complex production in order to introduce the tooth arrangement into the upper side of the engagement element. As a result of a machining processing operation, a high degree of tool wear and time expenditure occur. Furthermore, the effective retention force of the positive-locking connection is dependent on the profile height of the positive-locking elements in the normal direction and the engagement force which is applied in the normal direction to the locking element in order to fix the clamping device.

Thus, a need exists to reduce the production complexity in the production of a steering column and to ensure a high degree of operational reliability.

DETAILED DESCRIPTION

Figure 1:
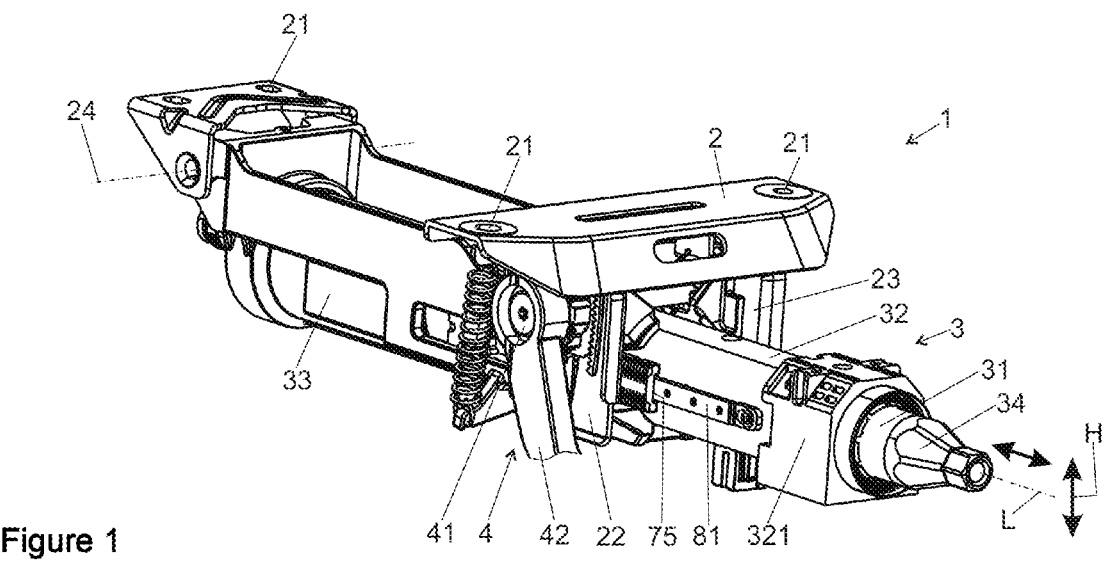
FIG. 1 is a perspective view of an example steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a steering column for a motor vehicle. In some examples, a steering column may comprise an outer casing unit which can be connected directly or indirectly to the body of a motor vehicle and in which there is retained so as to be able to be displaced in the longitudinal direction a casing pipe, in which a steering spindle is rotatably supported about the longitudinal axis thereof located in the longitudinal direction, and a clamping device which can be moved into a fixing position, in which it secures the casing unit relative to the casing pipe, and a release position, in which it releases a displacement of the casing pipe relative to the casing unit at least in the longitudinal direction, wherein the clamping device has an engagement element which is supported on the casing pipe and which extends in the longitudinal direction and which has an upper side which is located parallel with the longitudinal axis and lateral edge sides and a locking element which is supported in the longitudinal direction on the casing unit and which can be moved by the clamping device in order to adjust the fixing position in the normal direction of the upper side against the engagement element, wherein complementary positive-locking elements which are constructed on the locking element and the engagement element can be brought into engagement with each other in order to produce a positive-locking connection which is effective in the longitudinal direction and wherein an energy absorption device is arranged between the casing pipe and the engagement element.

In a steering column for a motor vehicle, comprising an outer casing unit which can be connected directly or indirectly to the body of a motor vehicle and in which there is retained so as to be able to be displaced in the longitudinal direction a casing pipe, in which a steering spindle is rotatably supported about the longitudinal axis thereof located in the longitudinal direction, and a clamping device which can be moved into a fixing position, in which it secures the casing unit relative to the casing pipe, and into a release position, in which it releases a displacement of the casing pipe relative to the casing unit at least in the longitudinal direction, wherein the clamping device has an engagement element which is supported on the casing pipe and which extends in the longitudinal direction and which has an upper side which is located parallel with the longitudinal axis and lateral edge sides and a locking element which is supported in the longitudinal direction on the casing unit and which can be moved by the clamping device in order to adjust the fixing position in the normal direction of the upper side against the engagement element, wherein complementary positive-locking elements which are constructed on the locking element and the engagement element can be brought into engagement with each other in order to produce a positive-locking connection which is effective in the longitudinal direction, and wherein an energy absorption device is arranged between the casing pipe and the engagement element, there is provision according to the invention for lateral positive-locking elements to be constructed at least on one of the edge sides of the engagement element.

The engagement element according to the invention has as known per se an upper side which faces the locking element in the normal direction and edge sides which delimit the upper side laterally, that is to say, transversely relative to the normal direction. The edge sides may accordingly have edge faces which extend in the normal and longitudinal direction and which are also referred to as side faces. Positive-locking elements protrude according to the invention laterally from at least one of the side faces transversely relative to the normal direction.

The width of the upper side is indicated by the dimension transversely relative to the normal and longitudinal direction between the edge sides. The height of the edge sides corresponds to the dimension transversely relative to the longitudinal direction in the normal direction. Preferably, the engagement element may have a planar, substantially rectangular cross section in which the width is greater than the height.

The positive-locking elements may preferably be constructed as a tooth arrangement with teeth which extend transversely relative to the longitudinal direction and which have tooth flanks which are located transversely relative to the longitudinal direction, at least partially in a normal direction. The engagement element may preferably be constructed as a toothed plate, in which the positive-locking elements have a tooth arrangement on at least one of the edge sides. The tooth arrangement may be formed by a plurality of teeth which protrude at least partially laterally, transversely relative to the normal direction, and whose tooth flanks extend at least over a portion of the height in the normal direction over the edge side.

The positive-locking elements may be introduced in an efficient and cost-effective manner into the edge sides, for example, by means of punching, in which a punching tool which has the contour of the positive-locking elements is moved in a processing stroke with a movement component in the normal direction relative to the engagement element. A strip-like engagement element having a flat cross section can thereby be produced as a punched component including the positive-locking elements on the edge sides, whereby in comparison with the introduction of positive-locking elements in the upper side the production complexity and the tool wear are reduced. Furthermore, the solution according to the invention affords the advantage that jumping of the positive-locking elements, that is to say, an undesirable displacement of the engagement element and the locking element relative to each other in the fixing position, in the event of a sudden introduction of force, such as, for example, in the event of a crash, is effectively prevented.

It is particularly advantageous for positive-locking elements to be constructed at the two edge sides and to protrude at both sides of the engagement element transversely relative to the longitudinal and normal direction. There may be provision for the positive-locking elements of the two edge sides to be constructed symmetrically relative to each other. Alternatively, it is also conceivable and possible for the positive-locking elements of the two edge sides to be constructed in an asymmetrical manner with respect to each other.

It is preferable for the locking element to have at least one side arm which engages around an edge side in the fixing position and which has positive-locking elements which correspond to the lateral positive-locking elements of the edge side. The side arm protrudes from the locking element in the engagement direction, that is to say, in the normal direction toward the upper side, and has an inner side which is opposite the edge side in the fixing position. The inner side preferably extends in this instance parallel with the edge side. At the inner side there are complementary positive-locking elements which correspond to the lateral positive-locking elements on the engagement element. For example, the locking element is constructed as a toothing block in which there are constructed on the inner side teeth whose tooth flanks extend parallel with the tooth flanks of the lateral tooth arrangement on the engagement element in the normal direction. During the fixing, the corresponding lateral positive-locking elements of the locking and engagement element are moved relative to each other, wherein the tooth flanks which produce the positive-locking connection are moved along each other along the extent thereof in the normal direction. This affords the advantage that the positive-locking elements already move at the beginning of the fixing movement, and consequently more rapidly, into engagement with the effective tooth cross section thereof than if the teeth are brought into engagement transversely relative to the extent thereof, as in the known positive-locking elements at the upper side.

Preferably, lateral positive-locking elements are constructed at both edge sides of the engagement element. For example, the engagement element may be constructed as a toothed plate, preferably with a planar rectangular cross section, wherein both edge sides have a tooth arrangement, each having a large number of teeth whose tooth flanks extend at least partially parallel with the normal direction of the upper side. Such a tooth arrangement at both sides can be produced effectively by means of punching.

Preferably, the locking element has two mutually opposing side arms between which the engagement element can be received. The side arms protrude in a normal direction with respect to the engagement portion, whereby the locking element is constructed in an inverted U-shaped manner. As a result of the fact that in the fixing position the locking element engages around the engagement element between the mutually opposing inner sides of the side arms, a positive-locking connection which is effective laterally transversely relative to the longitudinal direction is produced between the locking element and engagement element.

The two side arms have mutually opposing inner sides transversely relative to the longitudinal direction. At least at one of the inner sides, corresponding positive-locking elements which can be brought into positive-locking engagement with the engagement element are constructed. Preferably, both side arms and both edge sides have positive-locking elements. Preferably, the locking element is constructed as a toothing block with tooth arrangements which correspond to the lateral tooth arrangements of the toothed plate. In the fixing position, the engagement element engages with both side arms thereof around the edge sides of the engagement element at least partially. In this instance, the engagement element is received in a positive-locking manner between the side arms transversely relative to the longitudinal direction and at the same time, as a result of the lateral positive-locking elements, which mutually engage in a positive-locking manner, on the side arms of the locking element and the edge sides of the engagement element the positive-locking connection which is effective in the longitudinal direction is produced.

An advantage of the last-mentioned embodiment is that the positive-locking connection of the lateral positive-locking elements according to the invention in the securing position, that is to say, the fixing position, is locked in a force-free manner. This means that the clamping device in the fixing position does not have to apply a retention force in the engagement direction, that is to say, the normal direction, in order to maintain the positive-locking connection. As a result of the fact that the two lateral arms engage laterally around the engagement element, the positive-locking connections between the edge sides and the side arms are laterally supported and secured transversely relative to the normal direction, as a result of which the positive-locking connection is also maintained in the event of very high loads by force peaks in the event of a crash, even if the clamping device were to be damaged.

An advantageous embodiment makes provision for the lateral positive-locking elements to be inclined obliquely with respect to the normal direction. One or both edge sides may at least partially have inclined faces on which the positive-locking elements extend in a manner tilted with respect to the normal direction and which, when viewed in cross section, merge in the direction toward the upper side counter to the normal direction. Such an oblique face may, for example, be arranged diagonally in an edge region between the upper and edge side so that it forms with the upper side an angle greater than 90°. In particular because oblique faces with inclined positive-locking elements are arranged along both edge sides, a cross section of the engagement element which merges in a wedge-like manner in the direction toward the upper side can be produced. The wedge-like cross section facilitates during fixing the introduction of the engagement element in the normal direction between the two side arms of a locking element which is U-shaped in cross section. The oblique faces ensure as oblique introduction members that the locking element during fixing is independently centered transversely relative to the longitudinal direction on the engagement element. This results in an additional advantage that the positive-locking elements which extend in an inclined manner on the oblique faces, for example, tooth arrangements with teeth which extend at least partially obliquely with respect to the normal direction, move into engagement in a uniform and secure manner at both edge sides. This is particularly advantageous when both edge sides have positive-locking elements on both oblique faces, which are preferably inclined in a mirror-symmetrical manner with respect to each other.

Alternatively or additionally, the locking element may also have lateral positive-locking elements which are inclined in an oblique manner with respect to the normal direction and which may be constructed on oblique faces at the inner side of one or both side arms. The intermediate space which is open in the direction toward the engagement element between two lateral arms thereby expands in a V-shaped manner in the direction toward the engagement element. In this manner, oblique introduction members which facilitate the placement can also be produced when fixing and can ensure a mutual centering of the locking and engagement element.

It is possible for the locking element or the engagement element to have positive-locking elements which extend in an oblique manner or for positive-locking elements which extend in an inclined manner with each other to be arranged on mutually corresponding oblique faces on both the locking and engagement element. For example, complementary teeth may be inclined at least partially in a substantially identical manner.

As a result of the positive-locking elements which are arranged in an inclined manner, it is further possible, via the wedge effect, to produce a force translation, whereby the force which acts in the engagement between the positive-locking elements is greater than the engagement force which is applied in a normal direction for fixing by means of the clamping device. This results in a particularly secure positive-locking engagement.

Positive-locking elements which extend in an inclined manner may in principle as described for the edge side be introduced by means of punching, cold-forming or similarly effective shaping methods.

It is further possible for the positive-locking elements to be at least partially constructed in a convex or concave manner. The positive-locking elements, for example, teeth of a tooth arrangement, extend transversely relative to the longitudinal direction and may in this instance be arranged linearly in an elongate manner on a substantially planar base face, arranged according to the invention on an edge side in the normal direction or in contrast in a manner inclined in an oblique manner on an oblique face or, as in the prior art, on a planar upper side. In a development of the invention, however, it is also possible for the positive-locking elements to be arranged on a preferably curved basic shape which is outwardly formed or inwardly formed in cross section. For example, the edge side or the edge region between the edge side and the upper side may be constructed in a convex manner in cross section, that is to say, rounded outward, preferably in a curved manner, wherein the teeth also have a convex path which follows the convex-curved base face. It is also possible to configure one side to be convex in the manner of a channel. Within a convex or concave path, the positive-locking elements may assume different inclinations with respect to the normal direction. The specific advantages of differently inclined positive-locking elements can thereby be implemented in one structural form. Furthermore, slight misorientations, for example, as a result of dimensional tolerances or changing operating conditions, can be compensated for by rounded positive-locking elements, whereby the positive-locking engagement can be configured to be less sensitive to tolerances.

It is possible for the positive-locking elements on the locking and engagement element both to be configured in a planar manner or concave and complementary convex manner or both in a convex manner or concave and planar manner.

It is conceivable and possible for the engagement element to have positive-locking elements at least partially on the upper side. Preferably, according to the invention, positive-locking elements which are constructed in at least one of the edge sides, for example, teeth of a tooth arrangement, can extend around the edge region between the edge and upper side, and to be continued further over at least a part-region of the upper side. It is, for example, possible for the positive-locking elements to extend over oblique or rounded base faces which are arranged in the edge region.

A region which is free from positive-locking elements and which is at least 20% of the width of the engagement element may preferably be provided at the upper side of the engagement element.

It is advantageous for the engagement element to have a deformation element which is operationally connected to an energy absorption element which is arranged between the engagement element and the casing pipe. The energy absorption device is configured and arranged so that an energy absorption element in the event of a relative movement of the engagement element and casing pipe in the event of a crash, when the clamping device is in the fixing position, is plastically deformed with absorption of kinetic energy. Via the deformation element, the engagement element can introduce the kinetic energy into the energy absorption element. In the event of a crash, the deformation element brings about a plastic deformation, for example, by means of bending, separation, compression, expansion, machining or the like, of at least one energy absorption element or combinations thereof.

At least one deformation element may preferably be constructed in one piece with the engagement element, in a particularly preferred manner integrally in one piece. A simplified and cost-effective production and assembly is thereby enabled.

An advantageous embodiment of the invention makes provision for the engagement element to have guiding means at the lower side thereof facing away from the upper side and facing the casing pipe. The guiding means are configured to guide the engagement element relative to the casing pipe in the longitudinal direction and bring about in the event of a crash a specifically guided movement of the engagement element relative to the casing pipe so that the energy absorption element which is arranged therebetween is deformed in a defined manner. The engagement element may, for example, be constructed as a tab or sliding piece which can slide on a rail or a projection on the casing pipe in the longitudinal direction, or vice versa. The guide means may then simply comprise on the lower side of the engagement element which faces away from the upper side and which faces the casing pipe, a guiding groove or the like which extends in the longitudinal direction, whereby a positive-locking guide is produced transversely relative to the longitudinal direction.

There may be provision for the energy absorption element to have a deformation strip which is elongate in the longitudinal direction and which is secured to the casing pipe and which can be moved in the longitudinal direction with plastic deformation relative to a deformation element. The deformation strip may be constructed as an elongate strip in the longitudinal direction, for example, as a punched sheet metal strip, which in the end regions thereof is fixed externally to the casing pipe. On the engagement element, deformation elements which are preferably arranged at the lower side may have deformation means, which are in engagement with the deformation strip. The deformation means may, for example, have a passage which engages around the deformation strip and whose passage cross section is smaller than the outer cross section of the deformation strip. If the casing pipe is moved relative to the engagement element in the event of a crash, the deformation strip is forced along the length through the passage, and in this instance compressed and/or machined, whereby kinetic energy is absorbed.

The deformation strip may be guided in a guiding groove which is arranged on the engagement element and which extends in the longitudinal direction. The deformation strip thereby performs a dual function as an energy absorption and guiding element.

As an alternative to the deformation strip described, the energy absorption element may comprise a bending strip or wire which is continuously bent by a deformation element of the engagement portion in the event of a crash or is continuously bent in a manner supported between the deformation element and the casing pipe. Other known energy absorption systems may also be produced, for example, by means of a deformation element which is constructed as a mandrel on the engagement portion and which continuously expands a slot of an energy absorption element or by means of a tearing flap or the like which can be torn open.

Figure 2:
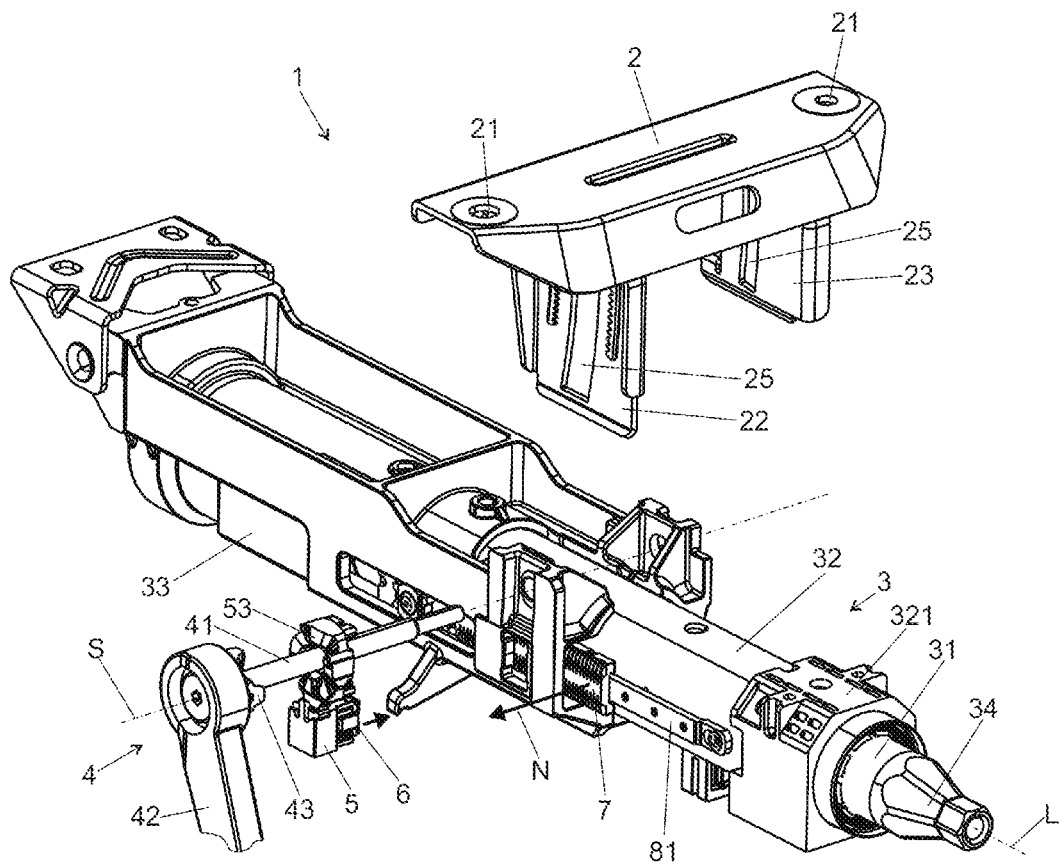
FIG. 2 is a partially-exploded perspective view of the steering column according to FIG. 1.

FIGS. 1 and 2 are perspective views, obliquely from the rear—with respect to the travel direction of a motor vehicle which is not shown in this instance—of a steering column 1 which has a carrier unit 2, having securing means 21 for connection to the body of the motor vehicle which is not shown, for example, as illustrated securing openings having different diameters for improved assembly in the motor vehicle. From the carrier unit 2, two mutually opposing side walls 22 and 23 extend in a downward direction.

An adjustment unit 3 is received between the side walls 22 and 23 and has a steering spindle 31 which is rotatably supported about the longitudinal axis L thereof in an inner casing pipe 32. The casing pipe 32 is received so as to be able to be longitudinally displaced in the longitudinal direction, in the direction of the longitudinal axis L, in an outer casing unit 33, as indicated schematically with a double-headed arrow. At the rear end with respect to the travel direction, the steering spindle 31 has a securing portion 34 for the rotationally secure fitting of a steering wheel which is not illustrated.

The casing pipe 32 has a fitting element 321 which is formed from a plastics material and which is securely connected to the casing pipe 32, for example, by means of a screw connection, rivet connection or by means of an ultrasonic welding operation. This fitting element 321 has a fitting structure with holes so that a steering column switching module which is not illustrated here can be connected to the fitting element 321 of the steering column 1.

The casing unit 33 is pivotably supported on the carrier unit 2 about a pivot axis 24 which is located transversely relative to the longitudinal axis L. The adjustment unit 3 for adjusting the height position of the steering wheel between the side walls 22 and 23 relative to the carrier unit 2 can thereby be moved up and down in a vertical direction H by being pivoted about the pivot axis 24, as indicated with a double-headed arrow.

A clamping device 4 is constructed in order to selectively clamp the adjustment unit 3 in a fixing position relative to the carrier unit 2 or in a release position to enable a displacement in the direction of the longitudinal axis L and/or in the vertical direction H.

The clamping device 4 has as an actuation element a clamping bolt 41 which extends transversely relative to the longitudinal axis L through elongate holes 25 in the mutually opposing side walls 22 and 23. The elongate holes 25 are expanded in a vertical direction H. At an end of the clamping bolt 41, an activation lever 42 is fitted in a rotationally secure manner, whilst the other end is supported on the side wall 23 in a rotatable but tension-resistant manner.

The activation lever 42 is connected in a rotationally secure manner to an eccentric disk 43 which is constructed as a cam disk with cams which protrude in the axial direction of the clamping bolt 41, that is to say, the clamping axis S axially from the exterior at the end face against the side wall 22.

A fixing element 5 is arranged on the clamping pin 41 between the eccentric disk 43 and the outer side of the side wall 22. The clamping pin 51 extends in the direction of the clamping axis S through an opening of the fixing element 5, as can be seen in FIG. 2. The clamping pin 41 can be rotated relative to the fixing element 5.

The fixing element 5 has a pressure disk 53 which is constructed as a cam disk. This disk has a circular-disk-like basic shape and is arranged coaxially relative to the opening 52. At the axial end face thereof, which in the assembled state faces the eccentric disk 43, the pressure disk 53 has axially protruding cams. The cams cooperate with the corresponding cams of the eccentric disk 43 which is fitted to the activation lever 42 in order to form a lifting gear mechanism known per se. For fixing, the clamping pin 41 is rotated about the clamping axis S thereof by means of the activation lever 42 or alternatively by means of a motor drive which is not illustrated. The fixing element 5 is securely retained on the side wall 22 with regard to rotation. The cam disk 43 and the pressure disk 53 thereby carry out a relative stroke in an axial direction of the clamping bolt 41 so that the pressure disk 53 and consequently the fixing element 5 is pressed transversely relative to the longitudinal axis L from the outer side against the side wall 22. The casing unit 33 and consequently the adjustment unit 3 are thereby tensioned or clamped between the side walls 22 and 23.

On the fixing element 5 there is fitted a locking element 6 which is configured according to the invention and which can preferably be constructed as a toothing block and is explained in detail below. The locking element 6 protrudes from the outer side in a manner directed counter to the adjustment unit 3 through the elongate hole 25 and is supported therein in the longitudinal direction on the casing unit 3.

The locking element 6 can be moved by the clamping device 4 in order to adjust the fixing position in the direction of the clamping axis S against an engagement element 7 which is fitted to the casing pipe 32. This engagement movement is carried out in the direction of the clamping axis S, as indicated with the arrow in FIG. 2, counter to a normal direction N which is located perpendicularly on the upper side of the engagement element 7, as will be explained in greater detail blow.

Figure 3:
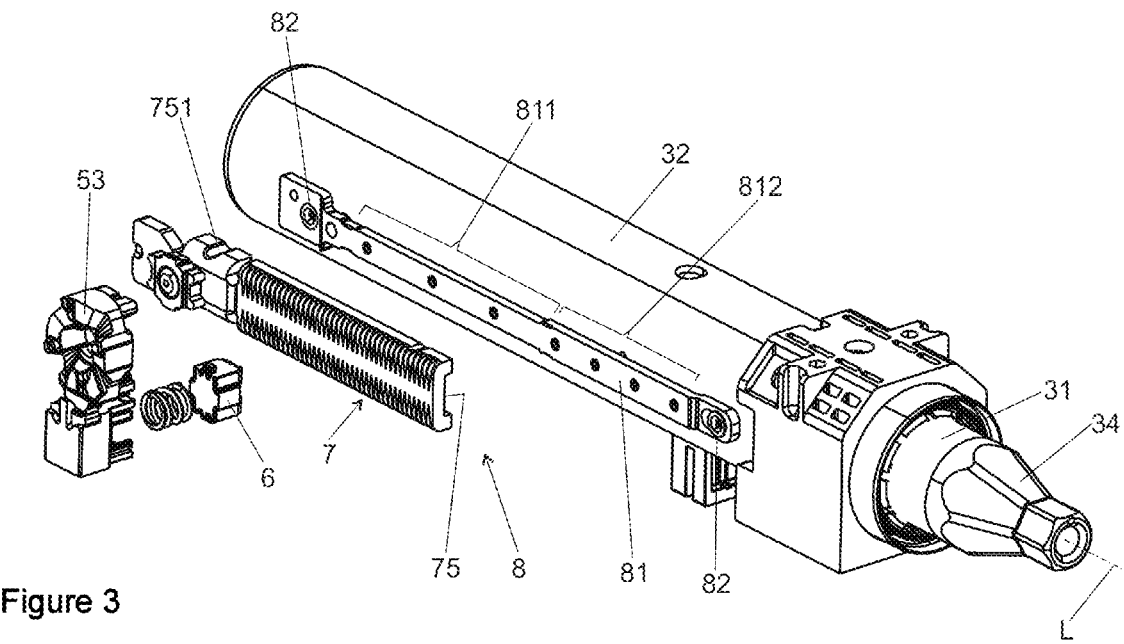
FIG. 3 is a partially-exploded perspective view of the steering column according to FIGS. 1 and 2.

An energy absorption device 8 is arranged between the engagement element 7 and the casing pipe 32 and has an energy absorption element 81. In the embodiment shown in FIGS. 1, 2 and 3, the energy absorption element 81 is constructed as a deformation strip which is elongate in the longitudinal direction and which is secured at the ends thereof by means of securing elements 82, such as rivets or the like in a non-releasable manner at the outer side to the casing pipe 32, as can be seen in FIG. 3.

Figure 4:
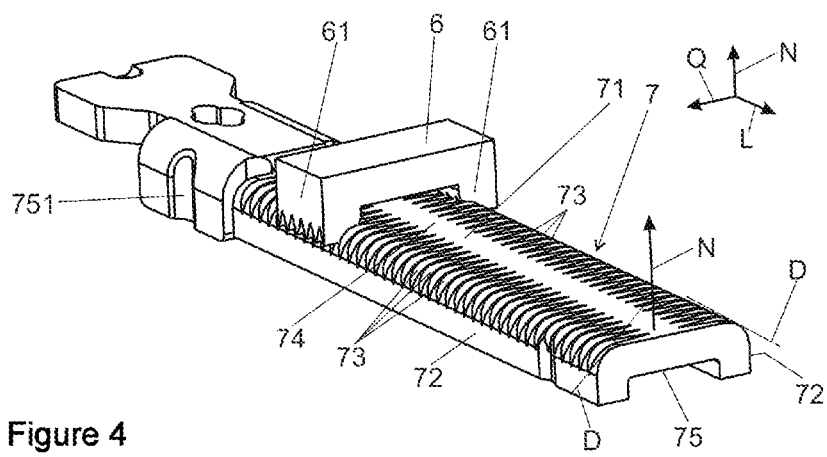
FIG. 4 is a perspective view of an engagement element and a corresponding locking element in a first embodiment.
Figure 5:
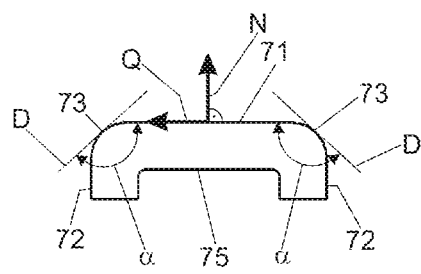
FIG. 5 is a cross-sectional view of the engagement element according to FIG. 4.
Figure 6:
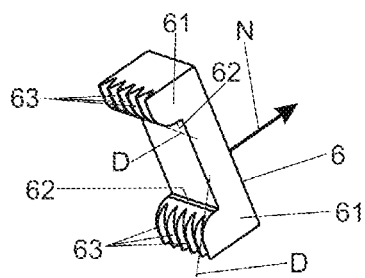
FIG. 6 is a perspective view of the locking element according to FIG. 4.

In FIG. 4, the locking element 5 is illustrated together with the engagement element 7 in operational engagement in the fixing position, that is to say, in mutual positive-locking engagement. FIG. 5 shows the engagement element 7 in a schematic cross section, wherein the plane of section is parallel with the normal direction N. In order to increase clarity, the shading has been omitted. FIG. 6 shows the locking element 6 in an individually cut-away manner.

The engagement element 7 has an upper side 71 which has a surface normal in the normal direction N. The upper side extends in a planar manner in the longitudinal direction L and transversely relative thereto in the transverse direction Q. Two lateral edge sides 72 extend in the longitudinal direction L and in the normal direction N and are located in the embodiment shown perpendicularly to the upper side 71.

The edge sides 72 each have a tooth arrangement having lateral positive-locking elements 73 which are constructed as teeth whose tooth flanks extend transversely relative to the longitudinal axis L. According to the invention, these lateral positive-locking elements 73 protrude laterally with the tooth cross section thereof transversely relative to the normal direction N, wherein the tooth flanks thereof extend at least in the upper part-region of the side faces 72 at least partially in the normal direction N.

In the embodiment according to FIG. 4, a specific feature is that the positive-locking elements 73 extend over the edge regions formed between the upper side 71 and the edge sides 72, wherein the teeth have a curved path. The positive-locking elements 73 are thereby constructed in a convex manner, on a basic shape which connects the upper side 71 to the edge sides 72 and which is curved in cross section.

In the path thereof, the tooth flanks are in this instance at least partially inclined with respect to the normal direction N and extend on inclined oblique faces D, as schematically depicted in FIGS. 4 and 5. Whilst the edge sides 72 as illustrated may be at right-angles relative to the upper side 71, the oblique faces may be inclined at an angle α (alpha) greater than 90° and less than 180° with respect to the upper side 71: 90°<α (alpha)<180°.

The inclined positive-locking elements 73 may be produced with less production complexity than in the prior art, for example, by means of obliquely positioned punching tools or the like.

The positive-locking elements 73 may extend from both edge sides 72 as far as the upper side 71, wherein there preferably remains on the upper side 71 a region 74 which is free from positive-locking elements 73 and which is preferably at least 20% of the width of the engagement element 7, measured in the transverse direction Q.

The locking element 6 has two side arms 61 which are directed counter to the normal direction N with respect to the upper side 71. FIG. 6 is a view from the upper side 71. At the inner sides 62 thereof which are transverse relative to the normal direction N and which are facing each other in the transverse direction Q, there are arranged positive-locking elements 63 which are constructed to complement the positive-locking elements 73 on the engagement element 7. In the example shown, there are constructed on the inner sides 62 teeth which extend transversely relative to the longitudinal axis L and which can engage in a positive-locking manner in the tooth arrangement of the engagement element 7 in order to produce a positive-locking connection which is active in the direction of the longitudinal axis L.

From the inner sides 62, the positive-locking elements 63 are constructed in the direction toward the front ends of the side arms 61 in a convex manner as curved teeth. In their path, they have a changeable inclination with respect to the normal direction N, from a parallel position up to an orientation which is substantially transverse relative to the normal direction N. In this instance, at least partially inclined oblique faces D, which are illustrated schematically in FIG. 6 and in FIGS. 4 and 5, are assumed.

In the engagement or fixing position shown in FIG. 4, the positive-locking elements 63 engage in the corresponding positive-locking elements of the engagement element 7 at the edge side in order to form a positive-locking connection which is effective in the longitudinal direction. The engagement element 7 is in cross section at least partially received between the side arms 61. The locking element 6 is also thereby fixed transversely relative to the longitudinal axis L in a positive-locking manner on the engagement element 7. As a result of the convex path, the arrangement is insensitive with respect to slight misorientations.

Figure 7:
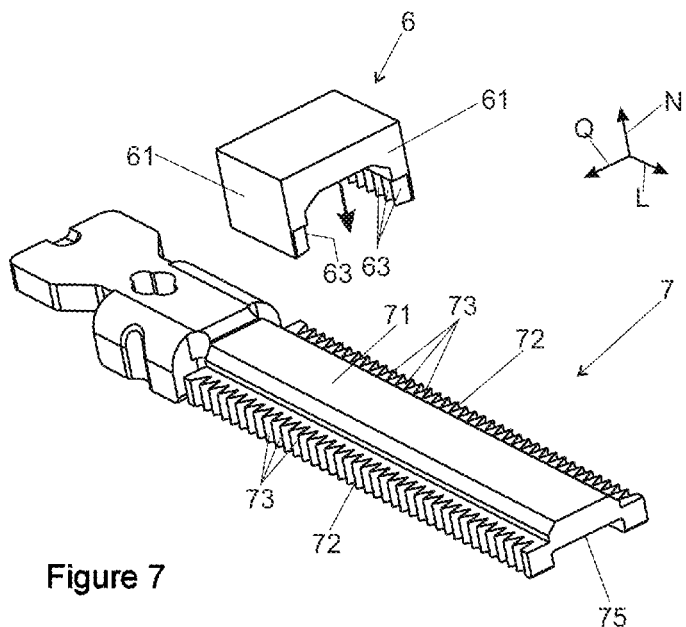
FIG. 7 is an exploded perspective view of an engagement element and a locking element in a third embodiment.
Figure 8:
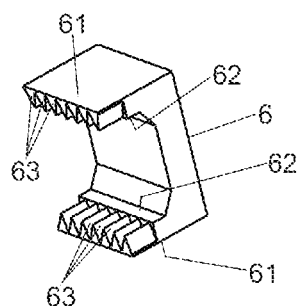
FIG. 8 is a perspective view of the locking element according to FIG. 6.

At the lower side thereof facing away from the upper side 61, the engagement element 7 has as a guide means a continuous guiding groove 75 in the longitudinal direction. FIG. 7 shows an engagement element 7 which has at the two edge sides 61 thereof positive-locking elements 73 which protrude at the edge side, transversely with respect to the normal direction N and which are each constructed as a linear tooth arrangement with straight teeth which extend parallel with the normal direction N. Accordingly, the fitting locking element 6 has at the inner sides of the side arms 61 positive-locking elements 63 which are directed toward each other and which are in the form of a corresponding tooth arrangement whose tooth flanks also extend parallel with the normal direction N.

For fixing, the locking portion 6 is moved from the release or disengagement position shown in FIG. 6 by means of the clamping device 4 counter to the normal direction N in the direction toward the upper side 71 until the engagement element 7 is received between the side arms 61 and the positive-locking elements 63 and 73 move into engagement with each other in order to form a positive-locking connection which is active in the longitudinal direction. In this instance, the locking element 6 is also retained transversely relative to the longitudinal direction in a positive-locking manner on the engagement element 7.

The energy absorption element 81 is received in the guiding groove 75 as can be seen in FIGS. 1 and 2. In the non-deformed state, the engagement element 7 is positioned with the guiding groove 75 on a retention portion 811 of the energy absorption element 81 which has a smaller width than the width of the guiding groove 75 mentioned. The retention portion 811 is adjoined by a deformation portion 812 which has a larger width than the inner width of the guiding groove 75. Furthermore, the engagement element 7 may have a guiding groove narrowing 751 which is also constructed as a deformation member and which deforms the energy absorption element 81 when the engagement element 7 is displaced relative to the energy absorption element 81.

During normal operation, the engagement element 7 is retained in the longitudinal direction in the retention region 811 in a positive-locking manner and can in particular not be displaced into the deformation region 812. In the event of a crash, the steering-wheel-side end of the steering spindle 31 is acted on by a high crash force which presses the deformation region 812 into the guiding groove 75 in the longitudinal direction, wherein the deformation region 812 is compressed in the engagement element 7, that is to say, plastically deformed, whereby kinetic energy is absorbed. In the event of a crash, the engagement element 7 is secured by the engagement of the locking portion 6 so that the casing pipe 31 is displaced together with the energy absorption element 81 relative to the engagement element 7 and in this instance the energy absorption element 81 is deformed by the engagement element 7.

The guiding groove 75 consequently acts in the event of a crash at the same time as a guiding and deformation element, which is constructed in an integral manner in one piece with the engagement element 7.

Figure 9:
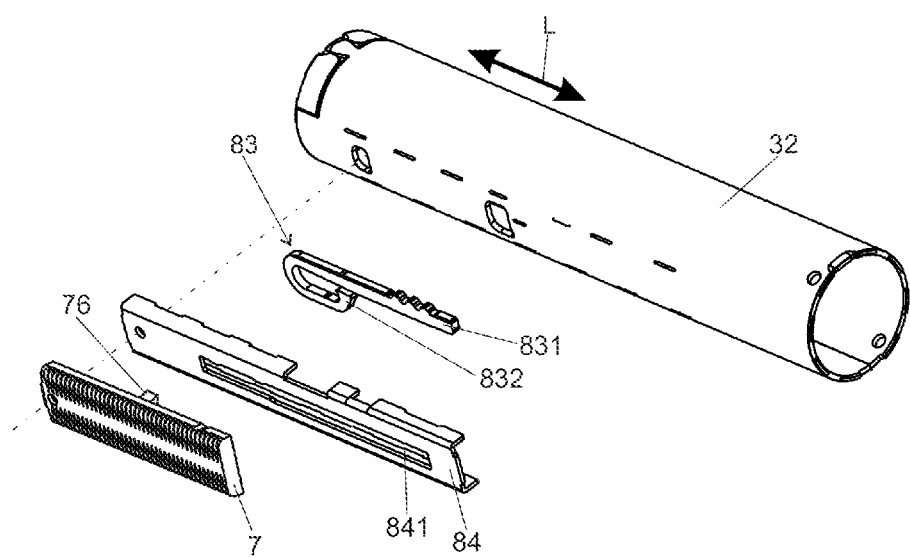
FIG. 9 is an exploded perspective view of a second embodiment of an energy absorption device.

FIG. 9 shows another embodiment in which as an energy absorption element there is inserted a bending strip 83 which has a first end 831 on a first limb which faces in the longitudinal direction and which is connected by means of a bending of approximately 180° to a second limb which also faces in the longitudinal direction and which has at the end thereof a bent hook 832. The first end 831 is supported in the longitudinal direction against a U-shaped retention profile 84 which is secured to the casing pipe 32.

The engagement element 7 has as a guiding means a carrier pin 76 which is guided through a slot 841 which extends in the longitudinal direction in the retention profile 84 and which engages behind the hook 832 of the bending strip 83.

In the event of a crash, the carrier pin 76 slides along in a manner guided in the slot and carries the hook 832 in the longitudinal direction in the direction toward the end 831, wherein the bending strip 83 is continuously bent, that is to say, the bending extends through the bending strip 83. As a result of this plastic bending shaping operation, kinetic crash energy is converted into deformation and absorbed. In this instance, the carrier pin 76 also acts as a guiding and deformation element which can preferably be constructed integrally with the engagement element 7.

LIST OF REFERENCE NUMERALS

1 Steering column
2 Carrier unit
21 Securing means
22, 23 Side walls
24 Pivot axis
25 Elongate hole
3 Adjustment unit
31 Steering spindle
32 Casing pipe
33 Casing unit
34 Securing portion
4 Clamping device
41 Clamping pin
42 Activation lever
43 Eccentric disk
5 Fixing element
53 Pressure disk
6 Locking element
61 Side arm
62 Inner side
63 Positive-locking elements
7 Engagement element
71 Upper side
72 Edge side
73 Positive-locking elements
74 Free region
75 Guiding groove
76 Carrier pin
8 Energy absorption device
81 Energy absorption element
82 Securing elements
83 Bending strip
831 End
832 Hook
84 Retention profile
841 Slot
L Longitudinal axis
H Vertical direction
S Clamping axis
N Normal direction
Q Transverse direction

What is claimed is:

1. A steering column for a motor vehicle, the steering column comprising:
    an outer casing unit that is connectable directly or indirectly to a body of the motor vehicle;
    a casing pipe that is retained in the outer casing unit so as to be displaceable in a longitudinal direction;
    a steering spindle rotatably supported in the casing pipe about a longitudinal axis thereof located in the longitudinal direction;
    a clamping device that is movable into a fixing position where the clamping device secures the outer casing unit relative to the casing pipe, the clamping device being movable into a release position where the clamping device permits displacement of the casing pipe relative to the outer casing unit at least in the longitudinal direction, wherein the clamping device includes:
        an engagement element that is supported on the casing pipe, extends in the longitudinal direction, has an upper side that is parallel to the longitudinal axis, and has lateral edge sides,
        a locking element that is supported in the longitudinal direction on the outer casing unit and is movable by the clamping device to adjust the fixing position in a normal direction of the upper side against the engagement element, and
        complementary positive-locking elements disposed on the locking element and the engagement element that are engageable with one another to produce a positive-locking connection effective in the longitudinal direction, wherein the complementary positive-locking elements include lateral positive-locking elements that are disposed on a first of the lateral edge sides of the engagement element,
        wherein the locking element includes a side arm that engages around the first edge side of the engagement element in the fixing position, wherein the side arm has positive-locking elements that correspond to the lateral positive-locking elements on the first edge side of the engagement element; and
    an energy absorption device disposed between the casing pipe and the engagement element.

2. The steering column of claim 1 wherein the side arm is a first side arm, wherein the locking element includes two mutually opposing side arms, including the first side arm and a second side arm, between which the engagement element is receivable.

3. The steering column of claim 1 wherein the lateral positive-locking elements are inclined obliquely relative to the normal direction.

4. The steering column of claim 1 wherein the complementary positive-locking elements are at least partially convex.

5. The steering column of claim 1 wherein the complementary positive-locking elements are at least partially concave.

6. The steering column of claim 1 wherein at least some of the complementary positive-locking elements are disposed on the upper side of the engagement element.

7. The steering column of claim 6 wherein the at least some of the complementary positive-locking elements disposed on the upper side of the engagement element extend from the upper side to at least one of the lateral edge sides of the engagement element.

8. The steering column of claim 1 wherein the engagement element includes a deformation element that is operationally connected to the energy absorption device.

9. The steering column of claim 8 wherein the energy absorption device includes a deformation strip that is elongate in the longitudinal direction and that is secured to the casing pipe, wherein the deformation strip is movable in the longitudinal direction with plastic deformation along the deformation element.

10. The steering column of claim 1 wherein the engagement element includes guiding means.

11. The steering column of claim 1 wherein the complementary positive-locking elements are configured as a tooth arrangement with teeth that extend transversely relative to the longitudinal direction.

12. A steering column comprising:
an outer casing unit;
a casing pipe that is retained in the outer casing unit so as to be displaceable in a longitudinal direction;
a steering spindle rotatably supported in the casing pipe about a longitudinal axis thereof located in the longitudinal direction;
a clamping device that is movable into a fixing position where the clamping device secures the outer casing unit relative to the casing pipe, the clamping device being movable into a release position where the clamping device permits displacement of the casing pipe relative to the outer casing unit at least in the longitudinal direction, wherein the clamping device includes:
an engagement element that is supported on the casing pipe, extends in the longitudinal direction, has an upper side that is parallel to the longitudinal axis, and has lateral edge sides,
a locking element that is supported in the longitudinal direction on the outer casing unit and is movable by the clamping device to adjust the fixing position in a normal direction of the upper side against the engagement element, and
complementary positive-locking elements disposed on the locking element and the engagement element that are engageable with one another to produce a positive-locking connection effective in the longitudinal direction, wherein the complementary positive-locking elements of the engagement element only extend along a portion of the engagement element, wherein the complementary positive-locking elements include lateral positive-locking elements that are disposed on a first of the lateral edge sides of the engagement element; and
an energy absorption device disposed between the casing pipe and the engagement element.

13. The steering column of claim 12 wherein the complementary positive-locking elements of the engagement element are flush with and do not protrude from the upper side of the engagement element.

14. The steering column of claim 12 wherein a central portion of the upper side that extends in a longitudinal direction is free of the complementary positive-locking elements, with the central portion being halfway between the lateral edge sides of the engagement element.

15. The steering column of claim 12 wherein the complementary positive-locking elements of the engagement element are disposed only at edges of the engagement element where the upper side meets the lateral edge sides.

16. The steering column of claim 12 wherein a lower side of the engagement element contains a groove that extends longitudinally, with the lower side being opposite the upper side, wherein an energy absorption element of the energy absorption device is received in and engages the groove of the engagement element.

17. The steering column of claim 12 wherein inner edges of the locking element extend longitudinally, wherein the complementary positive-locking elements of the locking element are disposed along at least one of the inner edges of the locking element.

18. The steering column of claim 12 wherein a groove of the engagement element is configured to deform an energy absorption element of the energy absorption device in a crash event.

19. A steering column comprising:
an outer casing unit;
a casing pipe that is retained in the outer casing unit so as to be displaceable in a longitudinal direction;
a steering spindle rotatably supported in the casing pipe about a longitudinal axis thereof located in the longitudinal direction;
a clamping device that is movable into a fixing position where the clamping device secures the outer casing unit relative to the casing pipe, the clamping device being movable into a release position where the clamping device permits displacement of the casing pipe relative to the outer casing unit at least in the longitudinal direction, wherein the clamping device includes:
an engagement element that is supported on the casing pipe, extends in the longitudinal direction, has an upper side that is parallel to the longitudinal axis, and has lateral edge sides,
a locking element that is supported in the longitudinal direction on the outer casing unit and is movable by the clamping device to adjust the fixing position in a normal direction of the upper side against the engagement element, and
complementary positive-locking elements disposed on the locking element and the engagement element that are engageable with one another to produce a positive-locking connection effective in the longitudinal direction, wherein the complementary positive-locking elements include lateral positive-locking elements that are disposed on a first of the lateral edge sides of the engagement element, wherein a greatest extent of each complementary positive-locking element on the engagement element where each complementary positive-locking element is most pronounced extends obliquely to the longitudinal axis; and
an energy absorption device disposed between the casing pipe and the engagement element.

* * * * *